United States Patent

[11] 3,537,484

| [72] | Inventor | Jack L. McLarty<br>Milwaukee, Wisconsin |
|---|---|---|
| [21] | Appl. No. | 780,108 |
| [22] | Filed | Nov. 29, 1968 |
| [45] | Patented | Nov. 3, 1970 |
| [73] | Assignee | Universal Oil Products Company<br>Des Plaines, Illinois<br>a corporation of Delaware |

[54] FILAMENT-WOUND PIPE
7 Claims, 2 Drawing Figs.

[52] U.S. Cl. .................................................. 138/109,
138/130, 138/144, 285/149
[51] Int. Cl. ............................................. F16l 11/02
[50] Field of Search .......................................... 138/109,
130, 144; 285/149, 423

[56] References Cited
UNITED STATES PATENTS

| 2,911,236 | 11/1959 | Thibault | 138/130X |
| 3,194,274 | 7/1965 | Griffiths et al. | 138/144X |
| 3,381,715 | 5/1968 | Michael | 138/109 |
| 3,381,716 | 5/1968 | Michael | 138/144X |
| 3,453,008 | 7/1969 | Lejeune | 138/109X |

Primary Examiner—Charles J. Myhre
Attorneys—James R. Hoatson, Jr. and Philip T. Liggett ABSTRACT: In a filament-wound pipe, the improvement comprising humps formed by quantities of filler material positioned around the exterior of the pipe to provide sections of enlarged diameter at the pipe ends, over which filaments are helically wound in both axial directions. The use of these humps near both ends of the pipe induces the forces acting on the pipe to act along the length of the filaments rather than with a shearing action against the bonds between filaments.

Patented Nov. 3, 1970 3,537,484

Inventor:
Jack Lowrie McLarty
By: James R. Hoatson, Jr.
Philip T. Liggett
Attorneys 3,537,484

FILAMENT-WOUND PIPE

This invention relates to an improvement in a filament-wound pipe comprising a quantity of filler material positioned circumferentially around the exterior of the pipe to near an end of the pipe to provide a hump or section of enlarged diameter. This filler material is helically overwound with filaments which reverse axial direction at least once between the aforesaid pipe end and the crest of filler material, that is, the portion of filler material furthest from the pipe axis. The hump formed has a substantially convex outer surface around the pipe with respect to the pipe axis.

The improvement of this invention modifies the geodesic paths of the filaments in such a manner that forces upon the pipe act more directly along the lengths of the filaments, which provide maximum tensile resistance, rather than against the weaker frictional and resin bonds holding the filament fibers together. The loads which act on the filament fibers may result from internal pressures within the pipe, pressures on the pipe, gravitational forces, and torsional forces. The improved pipe construction provides a surface configuration over which the filaments to be wound are maintained in the shortest possible paths, thereby undergoing no change in position when loaded by any of these different loads.

It is an object of the present invention to provide a filament-wound pipe construction which more fully utilizes the tensile strength of the filaments in resisting internal radial pressures tending to burst the pipe as well as longitudinal forces and torsional forces on the pipe, which tend to shear the bonds between filament fibers.

It is a further object of this improvement to effect a strengthened attachment of fastening means, such as flanges, threaded sections, plugs, and the like, to the ends of the filament-wound pipe sections. Since portions of such end attachments extend a short distance longitudinally along the pipe, the filament fibers tend to lock these portions in place at the points where these portions of an end attachment extend up the slope of the hump adjacent to the pipe end. The hump causes this binding or locking effect to be more pronounced than in conventional pipe.

Still another object of this invention is to strengthen the filament-wound pipe, as described herein, at a nominal cost, the only increase in cost over conventional filament-wound pipes being the cost of a quantity of filler material to form a pipe section of enlarged diameter having a substantially convex outer surface around the pipe with respect to the pipe axis.

In a broad aspect, this invention is, in a filament-wound pipe, the improvement comprising a quantity of filler material positioned circumferentially around the exterior of said pipe near an end of said pipe to provide a section of enlarged diameter, said filler material having an outer surface substantially convex with respect to the pipe axis and being helically overwound at least once in each axial direction by filaments which reverse in axial direction of winding between the pipe end nearest said filler material and the crest of said filler material. To maximize the ensuing benefits, the aforesaid improvement should be duplicated at the other end of the pipe, as well.

This invention may be utilized in connection with any type of filament-wound pipe. Some conventional pipe construction to which the improvement may be applied are: a pipe comprised entirely of filaments helically wound in alternating axial directions in a tubular form and set in a thermosetting resin, a pipe comprised of a plastic liner which forms the inside surface of the filament-wound pipe and outside of which is located the material used in the improved mode of filament winding described herein, and about which the filaments are set in a thermosetting resin and are helically wound in alternating axial directions, and a variety of other filament-wound pipe constructions.

This improvement can be applied to a filament-wound pipe having any shape of cross-sectional opening, such as a square or an elipse, though the broadest and most useful application is to a pipe having a circular cross section. The advantage of using the improvement in a pipe of circular cross section as opposed to use in a pipe having another cross-sectional shape is that if the internal pressures or axial forces are great enough to require the benefits of this improvement, these forces are generally sufficient to deform any other cross section of pipe into a circular shape.

The filler material which is positioned circumferentially around the pipe near an end of the pipe may be practically any material. To form a more homogenous composition in pipe in which the filaments are comprised of fiber glass and are set in a thermosetting resin, the aforesaid filler material is often at least partially comprised of resin impregnated chopped strand glass. A material of such a composition bonds cohesively to the fiber glass filaments used, and is readily available often being waste from other operations. A modification of such an embodiment exists where the filler material circumferentially positioned around the pipe is partially comprised of resin impregnated chopped strand glass, and is additionally comprised of a first part of a plurality of layers of fiber glass cloth, the second part of said layers extending from the nearest pipe end and forming an end attachment for the pipe, such as a flange, plug, or threaded section at the pipe end. The improvement disclosed herein can thus be used to effect a superior manner of attachment of a flange, plug, or threaded section to the main body of a pipe section. The superiority of such an attachment is that the portion of flange or other end section extending longitudinally toward the middle of the pipe, may be locked in place by the filament windings where it extends up the slope of the hump, as opposed to being attached to the pipe merely by the resin bonds and the forces of sliding friction between the aforesaid longitudinally extended portion and the overwound filaments. In one modification of this embodiment, each of the layers of the portion of fiber glass cloth extending toward the middle of the pipe terminates nearer the aforesaid nearest pipe end than does the next adjacent inner layer of fiber glass cloth therefrom. In this way, each of the layers of fiber glass cloth is bound to the fiber glass filaments, as opposed to a construction in which the inside layers of fiber glass cloth are sandwiched between the inner and outer layers of fiber glass cloth, which alone are bound to the fiber glass filaments.

The slope of the filler material positioned circumferentially around the pipe should always be substantially convex with respect to the pipe axis. That is, the filler material has a single crest from which it slopes down to the pipe surface in both axial directions at an initially increasing angle. It is between this crest and the nearest end of the pipe at which the filaments reverse axial direction and are overwound back along the pipe. As the slope of the surface adjacent the nearest pipe end of the aforesaid filler material increases, there may be a critical point at which there is a change in the forces acting upon the filaments. If the shape of the aforesaid filler material is such that the outside surface of a portion of the aforesaid filler material adjacent the nearest pipe end is at an angle with the pipe axis greater than is the angle of filament winding, an increase in pressure within the pipe will tend to pull the filaments transversely down the slope and towards the nearest end. If the slope of the filler material is such that the outside surface adjacent the nearest pipe end is at an angle with the pipe axis less than the angle of filament winding, an increase of pressure within the pipe will tend to pull the filaments transversely up the slope toward the crest of the filler material. At all points on the outside surface of the filler material adjacent the nearest pipe end where the slope is equal to the angle of filament winding, an increase of pressure within the pipe will produce only an increased force normal to the filament, thus tending to hold the filament in place. Therefore, the more of the surface that is at the angle of filament winding, the smaller will be the forces tending to shear the bonds of the filaments with the surrounding resin. This of course, is the ideal configuration, since the forces normal to the filament act on the tensile strength of the filaments rather than on the weaker resin bonds laterally restraining the filaments.

The various features of this invention are further illustrated in the accompanying drawings in which.

Figure 1:
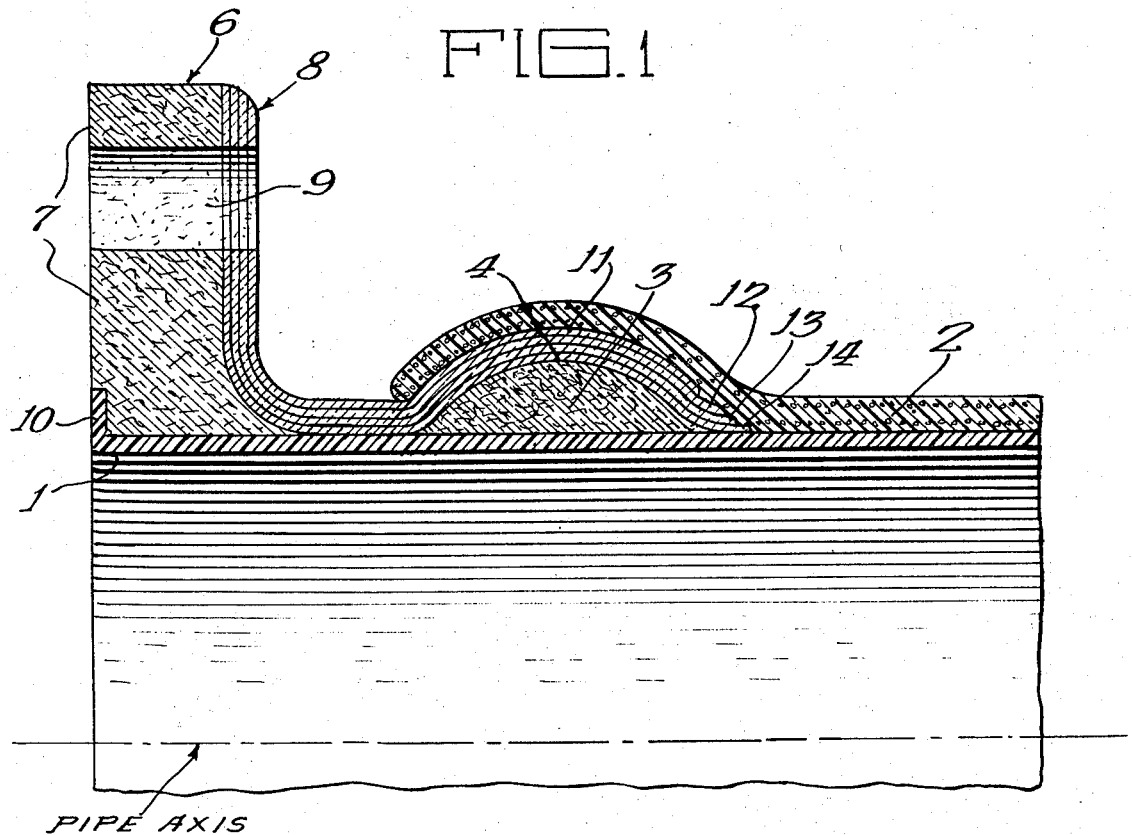
FIG. 1 is a sectional view of a portion of one embodiment of the improved filament-wound pipe.

Referring now to FIG. 1, the basic structure of the filament-wound pipe is comprised of an annular plastic liner 1, which forms the inside surface of the filament-wound pipe, and filaments 2, helically wound about plastic liner 1. Filaments 2 are constructed of fiber glass and are coated with an epoxy resin which, when set, bonds the filaments in place. Plastic liner 1 is constructed of polyvinyl chloride plastic and is bonded to the inner layer of filament windings. Near the end of the pipe shown is a quantity of filler material 3, the primary purpose of which is to form a hump which optimizes the forces acting on filaments 2 overwound thereon, in order to more fully utilize the tensile strength of filaments 2. Filler material 3 is comprised of resin-impregnated chopped strand glass positioned circumferentially around the plastic liner 1 and having an outer surface substantially convex with respect to the pipe axis over which filaments 2 are wound. At the maximum bulge of the convex surface of filler material 3 is the crest 4 of filler material 3 which is that part of filler material 3 furthest from the pipe axis. Filaments 2 are helically overwound about material 3. The axial direction of helical winding is reversed between crest 4 and the end of the pipe, and the filaments 2 are wound back over the previous windings. Several layers of filaments are overwound in this same manner, the number of layers depending upon the strength requirement for the pipe.

Figure 2:
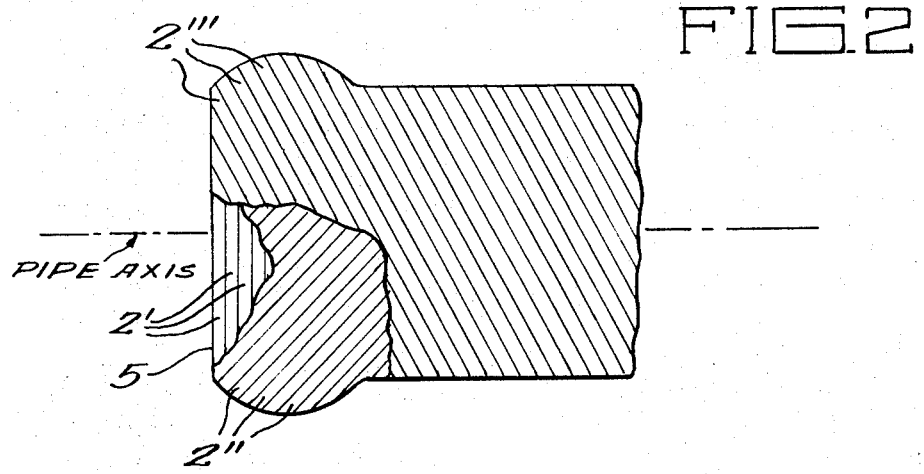
FIG. 2 is a partially cut away elevational view of another embodiment of the improved filament-wound pipe.

The pattern which the filament windings make is more clearly illustrated in FIG. 2, which is a portion of pipe comprised of fiber glass filaments coated with epoxy resin and helically overwound. The hump near the pipe end is formed by a filler material similar to the filler material to FIG. 1. This filler material is positioned circumferentially around the inner layers of epoxy-coated filaments, and overwound with subsequent layers of filaments. The innermost layer of filament windings which can be seen are filament windings 2'. These filament windings 2' are wound prior to filament windings 2'' and filament windings 2'''. The portions of filament windings 2' which are visible in FIG. 2 are those portions of the windings which are substantially circular as opposed to being helical. It is in this portion of filament windings 2' that the filaments reverse axial direction of winding. Filament windings 2' are wound in a left hand helical pattern up to the hump, as viewed from end 5 of the pipe. As the filaments pass over the hump formed by the filler material positioned circumferentially around initial filament windings of the pipe, they follow a geodesic path in reversing axial direction of winding. These filaments reverse axial direction of winding at the end of the pipe not visible and again emerge into view as filament windings 2'''. Filament windings 2''' are helically wound back over the filler material and thereupon resume a right hand helical winding path, as viewed from end 5.

Referring back to FIG. 1, a further modification of the improved pipe is illustrated. The end of the pipe is further comprised of a flange 6, which is made up of resin-impregnated chopped strand glass 7 and layers 8 of resin-impregnated fiber glass cloth, all of which are perforated by holes to accommodate bolts or other fastening means. One of these holes is shown as hole 9.

Flange 6 is further comprised of a radial extension 10 of plastic liner 1. Extension 10 and fiber glass cloth layers 8 thereby partially confine resin-impregnated chopped strand glass 7. Extension 10 forms a portion of the inside surface of flange 6 at the pipe end and forms an effective seal with similar mating flanges. Fiber glass cloth layers 8 are arranged so that the portions of each of the fiber glass cloth layers 8 which are bonded to material 3 and filaments 2, terminate nearer the pipe end than does the next adjacent inner layer of fiber glass cloth therefrom. Thus, fiber glass cloth layer 14 extends further in an axial direction towards the middle of the pipe than does the next consecutive outer layer 13. Similarly, layer 13 extends further in an axial direction towards the middle of the pipe than does layer 12, and layer 12 extends further in an axial direction than does layer 11. Portions of each of the layers 8 are overwound by and directly bonded to portions of filaments 2. The unique construction depicted insures a maximum bonding surface between filaments 2 and fiber glass cloth layers 8. In addition, the layers 8 are locked in place by filaments 2 on the slope of filler material 3 between crest 4 and the middle of the pipe. In all cases, embodiments of the improved filament-wound pipe illustrated in the present diagrammatic drawings are not to be considered as limiting. Likewise, the materials used in the construction of the improved filament-wound pipe and the applications and minor variations thereof are not to be limited to those set forth in this disclosure. Neither is the manner of the pipe construction nor the manner of winding, impregnating with thermosetting resin, nor positioning of the circumferentially positioned material described herein, to be considered limited.

I claim:

1. In a filament-wound pipe, the improvement comprising a quantity of filler material positioned circumferentially around the exterior of said pipe near an end of said pipe to provide a section of enlarged diameter, said filler material having an outer surface substantially convex with respect to the pipe axis and being helically overwound at least once in each axial direction by filaments which reverse in axial direction of winding between the pipe end nearest said filler material and the crest of said filler material.

2. The improved filament-wound pipe of claim 1 further characterized in that the aforesaid filaments are comprised of fiber glass and are set in a thermosetting resin and the aforesaid filler material is at least partially comprised of resin impregnated chopped strand glass.

3. The improved filament wound pipe of claim 2 further characterized in that the aforesaid filler material is additionally comprised of a first part of a plurality of layers of fiber glass cloth, the second part of said layers extending toward said nearest pipe end, there forming an end attachment at the pipe end.

4. The improved filament-wound pipe of claim 3 further characterized in that each of said layers of fiber glass cloth terminates nearer the aforesaid nearest pipe end than does the next adjacent inner layer of fiber glass cloth therefrom.

5. The improved filament-wound pipe of claim 2 further characterized in that there is a plastic liner forming the inside surface of said filament-wound pipe, and the aforesaid filler material is located outside of said liner and said filler material overwound by the aforesaid filaments.

6. The improved filament-wound pipe of claim 5 further characterized in that the aforesaid plastic liner extends radially outward at the aforesaid nearest pipe end, thereby forming a portion of the inside surface of a flange at the aforesaid pipe end.

7. The improved filament-wound pipe of claim 1 further characterized in that the aforesaid improvement is duplicated at the other pipe end.